United States Patent [19]
Gruber et al.

[11] 3,892,447
[45] July 1, 1975

[54] PLASTIC CAGES FOR ROLLER BEARINGS

[76] Inventors: Peregrinus Gruber; Gerald Seidelman, both of 3382 N. Avondale Ave., Chicago, Ill. 60618

[22] Filed: Oct. 17, 1973

[21] Appl. No.: 407,214

Related U.S. Application Data
[62] Division of Ser. No. 315,622, Dec. 15, 1972.

[52] U.S. Cl. ............................................. 308/217
[51] Int. Cl. ........................................... F16c 19/20
[58] Field of Search ........................... 308/217, 218

[56] References Cited
UNITED STATES PATENTS

| | | | |
|---|---|---|---|
| 1,080,288 | 12/1913 | Lockwood | 308/217 |
| 1,318,092 | 10/1919 | Lockwood | 308/217 |
| 1,413,173 | 4/1922 | Lovejoy et al. | 308/217 |
| 3,388,952 | 6/1968 | Schaeffler | 308/217 |
| 3,729,239 | 4/1973 | Camosso | 308/217 |

*Primary Examiner*—M. Henson Wood, Jr.
*Assistant Examiner*—Richard A. Bertsch
*Attorney, Agent, or Firm*—Robert L. Kahn

[57] ABSTRACT

This invention relates to plastic roller bearing cages preferably made from a mold described herein. The mold is so designed that the mold parts, illustrated in the drawings of the mold, cooperate to create a mold cavity having no flash except at the gate to the mold cavity. As a result of the mold construction, a plastic cage made in the mold dispenses with removal of excess plastic in the form of flash except for a minute amount at a gate. The product is a roller bearing cage into which rollers may be sprung and retained thereby.

1 Claim, 6 Drawing Figures

PLASTIC CAGES FOR ROLLER BEARINGS

This is a division, of application Ser. No. 315,622, filed Dec. 15, 1972.

FIELD OF THE INVENTION

The present invention relates to plastic cages for making roller bearings. Bearings utilizing roller bearing elements are well known and widely used. For many applications such as, for example, gardening equipment and applications where relatively low speeds and moderate bearing pressures are involved, it is possible to use roller bearings wherein cages for retaining the roller elements may be made of plastic. In many instances, the roller elements may also be of plastic (same or different from cages) or of steel as desired.

The advantages of such a bearing construction derive principally from reduced cost and dimensional accuracy obtainable with plastic molding and also, in the case of most plastics, economy of manufacture of cages as well as ease of assembly of cages and bearing elements.

DESCRIPTION OF THE BEARING STRUCTURE

Figure 1:
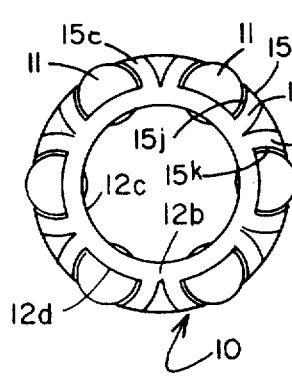
FIG. 1 is an end view of a roller bearing consisting of the plastic molded cage made by the mold and rollers assembled in the cage, the entire bearing structure being ready for use.
Figure 2:
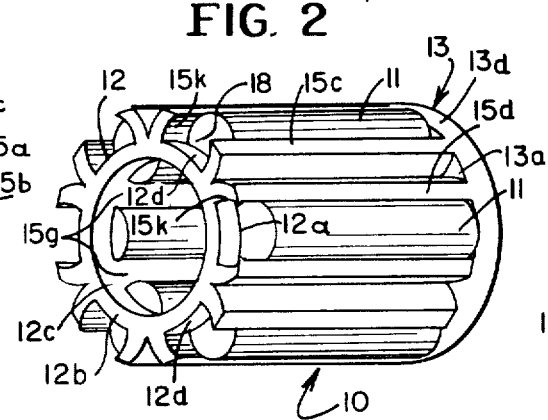
FIG. 2 is a perspective view of the roller bearing assembly shown in FIG. 1.
Figure 3:
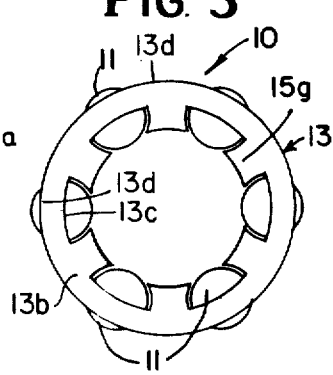
FIG. 3 is an end view similar to FIG. 1 but from the outer end of the cage and bearing structure.

Referring first to FIGS. 1 to 3 inclusive, the roller bearing construction illustrated in these figures is useful for a range of shaft sizes from about 3/16 inch up to about 2½ inches. It is understood that the race into which the roller bearing structure will fit will have corresponding larger diameters. Each roller bearing includes a cage generally indicated by 10 and a plurality of cylindrical rollers 11 disposed at spaced intervals within the cage. Rollers 11, which are the anti-friction elements, may either be of metal (as steel) or plastic. In either case, the roller material may be extruded and cut to suitable lengths. If of plastic, rollers 11 and cage 10 may be of suitable materials like nylon or Teflon which have a characteristic tendency to be self-lubricating. The diameter of a roller and the lengths will be determined by the overall dimensions of the roller bearing.

Cage 10 is of suitable plastic. The cage consists of small end ring 12 at one end of the cage and larger end ring 13 at the other end of the cage. Each end ring has flat inner and outer faces $12a$, $12b$; $13a$, $13b$ on opposite sides thereof, such faces generally lying in planes perpendicular to the coincident axes of the two end rings. Each of end rings 12 and 13 are shaped to provide concentric annular faces $12c$, $12d$; $13c$ and $13d$. At equal angular intervals along the circumference of each of rings 12 and 13, extending laterally and integrally molded therewith are generally Y shaped ribs having upper Vee shaped portions $15a$ and $15b$. Each rib portion $15a$ and $15b$ of a Y rib makes a Vee, with the Vee bottom being radially inward of Vee outer parts $15c$ and $15d$. Each Vee extends straight and parallel to the cage length (between end rings 12 and 13 as measured along the cage axis). The Vee bottom is in line between outer annular face $12d$ of ring 12 and inner annular face $13c$ of outer end ring 13. The Vee opposing faces of a pair may be straight or curved convexly as viewed from a cage end (as in FIG. 1). The Y innermost (radially) portion $15g$ of a rib ends in an arcuate portion of a cylinder as an extension of cylindrical annulus $12c$ determined by end ring 12. At the larger end of ring 13, inner portion $15g$ of each rib extends radially inwardly of end ring 13, see FIG. 3.

Each Vee portion $15a$ and $15b$ of a Y rib has each outer Vee faces $15j$ and $15k$ curved, as seen in FIG. 1, but straight along the cage length. Opposed Vee outer faces $15j$ and $15k$ of adjacent Vee parts $15a$ of one Y rib and $15b$ of an adjacent Vee pair cooperate to provide a longitudinal cradle space 18 having concave sides within which roller members 11 may be sprung. Roller members 11 preferably have a length somewhat less than the distance between opposed planar faces $12a$ and $13a$ of the end rings. This will make it easier to spring a length of roller into position with some clearance between end face $13a$ and the end face of a roller element. For example a cradle length (between ring faces $12a$ and $13a$) can have a roller clearance at the roller end of about 1/16 inch. The amount of clearance will depend on such factors as nature and elasticity of cage material, roller diameter and window width to a cradle region (determining amount of springing necessary), thickness of cage parts to be sprung. Some increase in the window width near end ring 13 to have the window a bit wider (as for example about 0.001 or 0.002) may also be provided to promote roller springing into position without excessive cage distortion at ring 13.

Preferably, the intersection of Vee outer part $15c$ and Vee outer side face $15j$ is rounded to eliminate sharp edges. The same is true of parts $15d$ and $15k$. The wall thickness of Vee parts $15c$ and $15d$ is small enough so that the Vee walls can yield during springing a roller member into its cradle.

The width radially of ring 12 is generally equal to the radial width of ring 13. The inner diameter of ring 12 is somewhat larger than the race diameter within rollers 11 of an entire roller bearing. Similarly the outer diamter of ring 13 must be somewhat smaller than the race diamter encircling the roller bearing. The difference between these diameters will be equal to twice the roller diameter. Vee outer parts $15c$ and $15d$ preferably lie in the cylindrical surface determined by outer annulus $13d$ of end ring 13.

The outer surfaces $15j$ and $15k$ of a rib merge into the sides of rib portions $15g$, this rib portion constituting the radially inner or bottom part of a Y rib. The cradle region 18 thus defined has radially continuous concave side walls, extending straight along the cage length. The curvature of the cradle side walls is somewhat greater than the radius of curvature of a roller element 11.

The angle subtended by a curved rib side defining a cradle region will depend upon engineering considerations. The same is true of the angular spacing between adjacent rollers. The six roller complement disclosed herein is by way of example. Any number of rollers with adequate physical spacing between adjacent rollers is possible.

DESCRIPTION OF THE MOLD FOR MAKING THE BEARING CAGE

Figure 4:
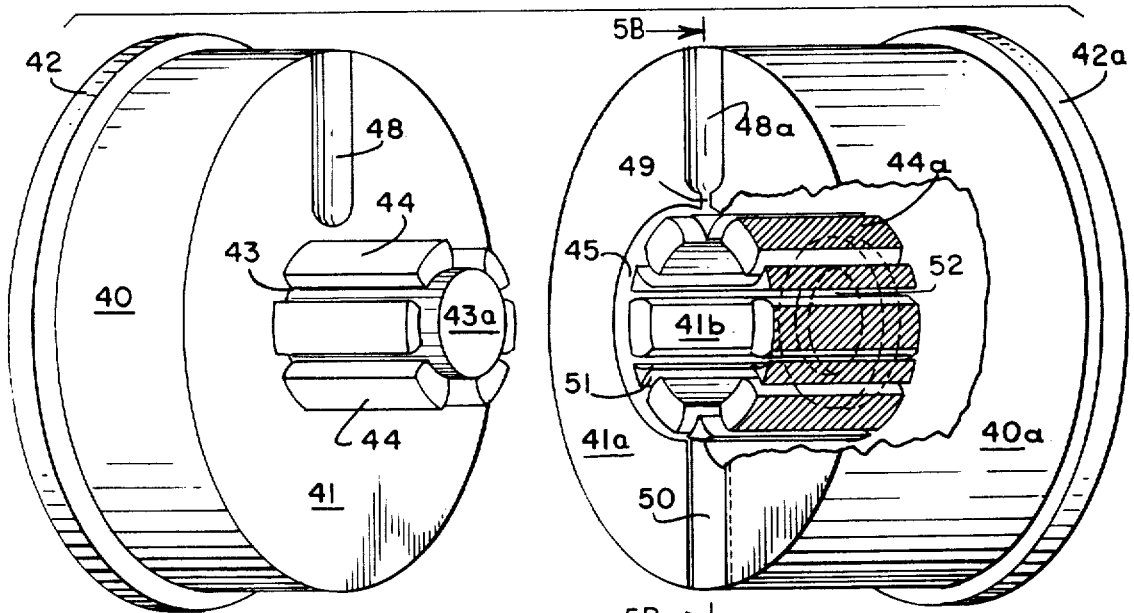
FIG. 4 is a perspective view of the male portion of the die mold and a perspective view with certain parts broken away of the female die mold embodying the present invention.
Figure 5A:
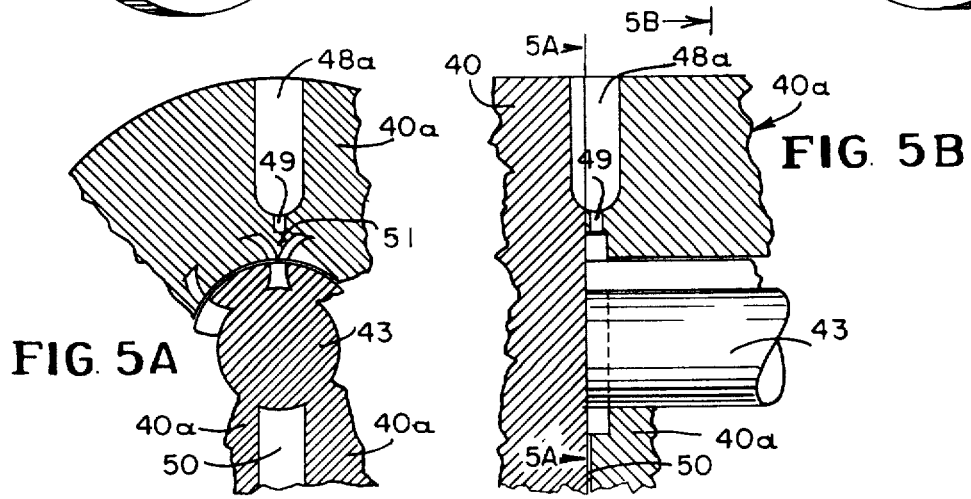
FIGS. 5A and 5B are enlarged mold details showing the orientation of the gate with respect to the core axis and location of the gate with respect to the female die cavity respectively.
Figure 5B:
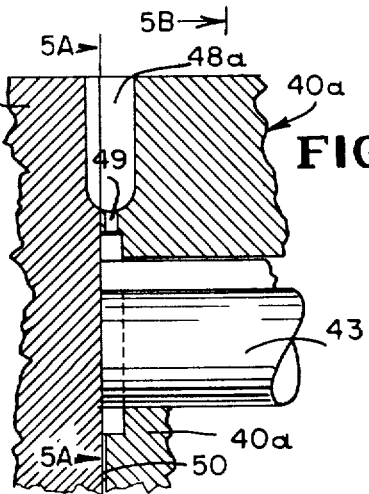

Referring now to FIG. 4, a single cavity twopiece mold is illustrated. The left of FIG. 4 illustrates the male die portion. This male portion of the mold comprises mold block 40 having finished flat face 41. Mold block 40 carries mold base 42. Base 42 may be integral with block 40 or may be a separate plate, securely bolted thereto. Projecting from flat mold block face 41 perpendicularly is core member 43 having flat end face 43a. Core part 43 would normally be cylindrical except for the fact that it has radiating outwardly therefrom elongated teeth 44. Each tooth 44 extends from finished face 41 along outer surface of core 43. Each tooth member 44 is dimensioned and shaped to generate one-half of the radial dimension of a roller cradle region 18 between oppositely curved rib sides of rib portion 15g. The outer ends of teeth 44 will lie on a cylindrical surface coaxial with core 43. The free ends of teeth 44 stop sufficiently short of core end 43a to define an annular region so that ring 12 can be cast. The spaces between adjacent teeth 44 accommodate plastic for cage rib parts 15g.

Face 41 of die block 40 is flat and accurately finished. Cut into face 41 of block 40 and extending radially from the exterior of the outer surface of die block 40 is one-half of runner 48. Runner 48 is a semicylindrical or any other shaped channel for feeding molten plastic. Runner portion 48 extends toward the base of core 43 and is located to terminate spaced from but opposite a space between adjacent teeth 44.

It is understood that die block face 41 and the entire exterior surface of core 43 and teeth 44 are accurately finished to impart a smooth glossy surface to the molded product. Runner half 48 is preferably short and smooth and normally requires no fine polished finish. Die block 40 may contain suitable piping or conduits within the block for liquid or steam for chilling or heating the entire block, this being well known in the art. While die block 40 may be of any suitable material, the portion of the block having face 41 and the entire male portion of the die consisting of core 43 and teeth 44 are preferably of hardened tool steel or other suitable material having a long useful life.

Cooperating with the male portion of the die is a female die block forming the right part of FIG. 4. The female die portion has relatively massive die block 40a of suitable shape. Die block 40a has flat finished face 41a conforming to finished face 41 of the male die block. Die block 40a has base 42a. It is understood that finished faces 41 and 41a here shown as flat with circular borders are similar in dimensions and are finished to a similar degree of precision. A portion of the female die block is shown as broken to expose elongated teeth 44a whose orientations conform to teeth 44 of the male die block. The inner face 41b of each of the long teeth in the female die block is dimensioned and oriented so that when the two blocks are moved into interfitting engagement to create a die cavity, inner faces 41b will clear the outer faces of teeth 44 of the male die block. The thickness radially of each tooth 44a may be equal to the thickness of each tooth 44 of the male die block.

The radial thickness of cage end ring 12 is determined by the radial thickness of teeth 44. Teeth 44a are radially offset so that female die block teeth 44a can slide over the outer surface of teeth 44 of the male die block. Two cooperating teeth 44 and 44a, when the dies are interfitting, will create one cradle space between adjacent parts 15a of one rib and 15b of an adjacent rib of the cage illustrated in FIGS. 1 to 3 inclusive. For most plastics, a clearance between opposed outer faces of teeth 44 and inner faces of teeth 44a of the order of about 0.002 inches will suffice for cut-off. Since dies may be heated or chilled, sufficient clearance must be provided to prevent jamming.

To create the space for each rib pair between Vee rib parts 15a and 15b, suitable core parts 51 having a generally triangular cross section are provided. The sides of core parts 51 may be shaped to provide desired contours to rib parts 15a and 15b. Core parts 51 extend inwardly of the female die cavity to bottom 52 of the cavity. Thus cradle side walls 15a and 15b are extended to the very end of the cage and radiate outwardly from end ring 12 of the cage.

The orientation of the male and female die parts is such that parts 51 of the female die must be opposite the spaces between adjacent teeth 44 of the male die. Thus rib parts 15g will be cast between adjacent teeth 44 and radially inwardly. Rib parts 15a and 15b will be cast just beyond (radially) rib parts 15g.

To cast end ring 13, teeth 44a and core parts 51 stop short of die face 41a to provide annular region 45. Plastic can fill region 45 and integrate this ring with the ends of the rib parts. It will thus be seen that uniformly spaced ribs have their respective ends integral with longitudinally spaced end rings 12 and 13, having generally equal radial widths but different radii. Each rib as a whole has a generally Y section with each space between adjacent teeth 44 of the male die being responsible for the straight lower part of the Y and the spaces laterally of core parts 51 and inwardly thereof being responsible for the upper part of the Y, including the junction part between the Vee top and bottom Y parts. To this end, the innermost edge of each core member 51 should not extend radially too far to insure the formation of a complete Y.

By having end rings 12 and 13 of equal radial width, the outer diameter of end ring 12 equal to the inner diameter of end ring 13, the bottom of the Vee on a line between the outer (radial) edge of ring 12 and inner (radial) edge of end ring 13, the opening of the mold cavity and removal of the molding will be free from trouble. It is understood that the male die part is movable (relatively to the female die part) along a straight line perpendicular to the plane of finished die faces 41 and 41a. The die opening travel should be sufficient to permit removal of the finished molding.

Corresponding to runner groove portion 48 in face 41 of the male die there is provided cooperating runner groove 48a in face 41a of the female die. When the dies are in cooperating position for a molding operation, parts 48 and 48a register to form a runner duct having a complete cross section with a diameter of the order of about ¼ of an inch. Gate 49 is cut deep enough into face 41a of the female die block to conduct molten plastic from the runner right to the die cavity to annular region 45 (for forming end ring 13). Gate 49 is preferably oriented so that it terminates at a region not only for forming end ring 13 but at about the radially outward projection of the Vee bottom edge. Thus plastic flow into the die cavity is facilitated.

In accordance with customary pratice, it is preferred to have the runner and gate straight and short. Diametrically opposite gate 49 and cut into face 41a of the female die block is air relief channel 50. This channel may have a width of about ¼ inch and a depth of the order of about 0.001 inches. This will prevent plastic entry.

It is possible to add an additional runner and gate at the other end of the female die block nearest base 42a into the region for molding ring 12. An additional runner or gate may be positioned or oriented in a manner corresponding to runner 48a and gate 49.

As with the male die block, removing metal to create teeth 44a in the region at the blind end of the block recess may be accomplished by milling and electronic milling procedures. The die blocks may be separate from the bases to eliminate blind spots. The die blocks may be operated for casting in any position. Thus, it is not necessary that the runners or gates be on top of the die block. As is well understood in this art, cooperating die blocks may be provided with pilot pins and holes so that cooperating parts of the die will be properly oriented. Each of the die parts is mounted in a suitable press so that one or other or both die parts may be moved along a straight line to open or close the die. After a molding cycle, it will be found that a plastic cage requires only separation of the casting from the gate plastic by a simple cutting operation. In fact, as a rule, a cutter may be provided to move against the exposed gate when the die blocks are opened. Due to the nature of the die blocks and cage design, it will be found that a smooth cage free from flash will be produced.

ADVANTAGES OF CAGE

The cage as described has substantial advantages for molding. The Y rib structure makes it easier to spring roller members into a cage. In addition, a minimum amount of plastic per cage is used. Finally, the cage construction is such that no large masses of plastic impede rapid heating or cooling of a molding die. Plastic material is inferior to metal for heat (or cold) conduction. Thus economical and rapid cycling of a molding facility is attainable.

It is evident that the mold and cage cooperate for fast and efficient molding.

The end 43a of core 43 is adapted to cooperate with female die cavity bottom 52 for plastic cut-off. It is possible to have the cooperating die portions of any suitable shape for accomplishing this. It is also understood that the inner window of cradle region 18 must be narrow enough to retain a roller member within the cradle. The roller members must be able to project inwardly of the inner cradle windows and outwardly through the outer cradle windows to function as roller bearings.

Conventional draft die tapers are provided for facilitating separation of die and plastic.

What is claimed is:

1. A one-piece molded plastic roller bearing cage comprising two spaced coaxial annuli in spaced parallel planes, each annulus having flat side faces and inner and outer cylindrical faces, a plurality of equally spaced ribs extending between said annuli, the outer diameter of one smaller annulus being equal to the inner diameter of the other larger annulus, each rib extending radially between the coaxial cylindrical surfaces defined by the inner diameter of said one smaller annulus and outer diameter of said other larger annulus, said ribs extending parallel to the axis of the annuli, each rib having a Y section, the Vee top being radially beyond the straight part of the Y, the Vees extending radially inward to the cylindrical surface defined by the outer surface of the smaller annulus and extending from the inner flat face of the larger annulus to the plane determined by the outer flat face of the smaller annulus, the Vee tops each having Vee sides curved to provide a suitable cradle region between adjacent Vee portions, the sides of a rib radially inward of the Vee being concave so that one entire rib side provides a concave cradle wall to cooperate with an opposed cradle wall from an adjacent rib, a complete cradle side wall having radially innermost and outermost longitudinal edges to define an inner and outer window between adjacent ribs, the inner and outer windows respectively being terminated by the opposed side faces of the smaller and larger annuli, said rib portion radially inward of the Vee extending from the plane of the outer flat face of the larger annulus to the inside flat face of the smaller annulus, the inner window of each cradle being narrow enough to retain a suitably sized roller within the cradle region, the outer window being wider than the inner window but narrow enough to require the roller to be sprung into a cradle, the cradle sides having a radius of curvature somewhat greater than that of a roller in the cradle region, said cage being characterized by minimum plastic material, strength and ready springing of a roller into or out of its cradle.

* * * * *